United States Patent
Kim et al.

(10) Patent No.: US 9,818,354 B2
(45) Date of Patent: Nov. 14, 2017

(54) LIQUID CRYSTAL DISPLAY INCLUDING CONNECTOR OVERLAPPING COMMON ELECTRODE CUTOUT

(71) Applicant: SAMSUNG DISPLAY CO., LTD., Yongin-si, Gyeonggi-Do (KR)

(72) Inventors: Jae Won Kim, Asan-si (KR); Hyung Jun Park, Seongnam-si (KR); Seong Young Lee, Hwaseong-si (KR)

(73) Assignee: Samsung Display Co., Ltd., Yongin-Si, Gyeonggi-do (KR)

(*) Notice: Subject to any disclaimer, the term of this patent is extended or adjusted under 35 U.S.C. 154(b) by 87 days.

(21) Appl. No.: 14/854,621

(22) Filed: Sep. 15, 2015

(65) Prior Publication Data
US 2016/0098964 A1    Apr. 7, 2016

(30) Foreign Application Priority Data
Oct. 1, 2014    (KR) .................. 10-2014-0132646

(51) Int. Cl.
*G09G 3/36* (2006.01)
*G02F 1/1368* (2006.01)
*G02F 1/1362* (2006.01)

(52) U.S. Cl.
CPC ......... *G09G 3/3614* (2013.01); *G02F 1/1368* (2013.01); *G02F 1/136286* (2013.01); *G09G 3/3648* (2013.01); *G09G 2300/0876* (2013.01); *G09G 2310/0205* (2013.01)

(58) Field of Classification Search
None
See application file for complete search history.

(56) References Cited

U.S. PATENT DOCUMENTS

| 7,701,520 B2 | 4/2010 | Ohashi et al. |
| 7,705,926 B2 | 4/2010 | Kim et al. |
| 8,098,340 B2 | 1/2012 | Kim |
| 8,253,874 B2 | 8/2012 | Kim et al. |
| 2008/0284700 A1 | 11/2008 | Oke et al. |
| 2010/0045884 A1 | 2/2010 | Ahn et al. |
| 2013/0182018 A1* | 7/2013 | Jeong .................. G09G 3/3659 345/690 |
| 2013/0201432 A1* | 8/2013 | Yun .................. G02F 1/134309 349/123 |

FOREIGN PATENT DOCUMENTS

| KR | 10-2006-0128564 A | 12/2006 |
| KR | 10-2007-0080475 A | 8/2007 |
| KR | 10-2008-0040478 A | 5/2008 |

* cited by examiner

*Primary Examiner* — Liliana Cerullo
*Assistant Examiner* — Donna Lui
(74) *Attorney, Agent, or Firm* — Lee & Morse, P.C.

(57) ABSTRACT

A liquid crystal display includes first and second substrates. The first substrate includes a gate line, data lines, a first reference voltage line, a second reference voltage line, a pixel electrode having a first subpixel electrode and a second subpixel electrode in a pixel area, and switch circuits connected to these lines and electrodes. The first and second reference voltage lines respectively apply a first and second reference voltages having different polarities. The second substrate includes a common electrode with a cutout. The first and second reference voltage lines include a first connector and a second connector parallel to the data line, and the first connector and the second connector overlap the cutout of the common electrode.

14 Claims, 8 Drawing Sheets

LIQUID CRYSTAL DISPLAY INCLUDING CONNECTOR OVERLAPPING COMMON ELECTRODE CUTOUT

CROSS-REFERENCE TO RELATED APPLICATION

Korean Patent Application No. 10-2014-0132646, filed on Oct. 1, 2014, and entitled: "Liquid Crystal Display," is incorporated by reference herein in its entirety.

BACKGROUND

1. Field

One or more embodiments described herein relate to a liquid crystal display.

2. Description of the Related Art

A liquid crystal display is one of the most widely used flat panel displays. This type of display has a high contrast ratio and a wide reference viewing angle. Such an angle may be, for example, a viewing angle in which contrast ratio is 1:10 or an inter-gray luminance inversion critical angle.

Structurally, a liquid crystal display includes a liquid crystal layer between two substrates having field-generating electrodes, e.g., a pixel electrode and a common electrode. The amount of light transmitted through the liquid crystal layer is controlled based on alignment of liquid crystal molecules in the liquid crystal layer. The alignment is controlled based on voltages applied to the field-generating electrodes.

A liquid crystal display may operate in a variety of modes. In a vertically aligned mode, long axes of the liquid crystal molecules are perpendicular to upper and lower display panels when an electric field is not applied.

In an attempt to increase side visibility in the vertically aligned mode, one approach involves dividing each pixel into two subpixels. In this case, the transmittances of light from these subpixels may be different by applying different voltages to the subpixels. However, this approach may increase the luminance from the side view compared with the front view in a low gray scale range. Thus, it may be difficult to accurately express gray scale values in a low gray scale range with this approach. Also, the entire luminance of the display may be reduced compared with the applied pixel voltage, which, in turn, may adversely affect driving efficiency.

Further, aperture ratio may be reduced using two signal wires to input signals having opposite polarities, with respect to the common voltage applied to respective pixel areas. When the two signal wires overlap the pixel electrode, the pixel voltage may change, producing a further adverse effect on display performance.

SUMMARY

In accordance with one or more embodiments, a liquid crystal display includes a first substrate; a gate line on the first substrate; a plurality of data lines on the first substrate; a first reference voltage line and a second reference voltage line on the first substrate to respectively apply a first reference voltage and a second reference voltage having different polarities; a pixel electrode in a pixel area and including a first subpixel electrode and a second subpixel electrode; a first switch circuit connected to the gate line, a first data line from among the plurality of data lines, and the first subpixel electrode; a second switch circuit connected to the gate line, the first data line, and the second subpixel electrode; a third switch circuit connected to one of the gate line, the first subpixel electrode, the first reference voltage line, and the second reference voltage line; a second substrate facing the first substrate; and a common electrode on the second substrate and including a cutout, wherein the first reference voltage line and the second reference voltage line include a first connector and a second connector parallel to the data line, and wherein the first connector and the second connector overlap the cutout of the common electrode.

A voltage difference between the first subpixel electrode and the common voltage may be greater than a voltage difference between the second subpixel electrode and the common voltage, and a magnitude of the first subpixel electrode may be greater than a magnitude of the second subpixel electrode.

The first subpixel electrode and the second subpixel electrode may include an integral plate and a plurality of branch electrodes extending from the integral plate, and the cutout of the common electrode may overlap the integral plate. The cutout of the common electrode maybe a cross-shaped cutout, and the first connector and the second connector may overlap the cross-shaped cutout of the common electrode. The first connector and the second connector may overlap the integral plate.

The first reference voltage applied to the one reference voltage line connected to the third switch circuit from among the first reference voltage line and the second reference voltage line, or a data voltage applied to the second reference voltage and the data line, may have a same polarity as the common voltage. Each of the first and second reference voltages may has a predetermined magnitude and the first and second reference voltages may have polarities which change per frame.

The first connector and the second connector may overlap the integral plate. The first reference voltage applied to the one reference voltage line connected to the third switch circuit from among the first reference voltage line and the second reference voltage line, or a data voltage applied to the second reference voltage and the data line, may have a same polarity as the common voltage. Each of the first and second reference voltages may have a predetermined magnitude and the first and second reference voltages may have polarities which change per frame.

In accordance with one or more other embodiments, a liquid crystal display includes a first substrate; a gate line on the first substrate; a plurality of data lines on the first substrate; a first reference voltage line and a second reference voltage line on the first substrate to respectively apply a first reference voltage and a second reference voltage having different polarities; a pixel electrode in a pixel area and including a first subpixel electrode and a second subpixel electrode; a first switch circuit connected to the gate line, a first data line from among the plurality of data lines, and the first subpixel electrode; a second switch circuit connected to the gate line, the first data line, and the second subpixel electrode; a third switch circuit connected to one of the gate line, the first subpixel electrode, the first reference voltage line, and the second reference voltage line; a second substrate facing the first substrate; and a common electrode on the second substrate, wherein the first reference voltage line and the second reference voltage line include a first connector and a second connector parallel to the data line, wherein the first subpixel electrode and the second subpixel electrode include an integral plate and a plurality of branch electrodes extending from the integral plate, and wherein the first connector and the second connector overlap the integral plate of the pixel electrode.

A voltage difference between the first subpixel electrode and the common voltage may be greater than a voltage difference between the second subpixel electrode and the common voltage, and a magnitude of the first subpixel electrode may be greater than a magnitude of the second subpixel electrode.

The common electrode may include a cutout, and the cutout of the common electrode may overlap the integral plate. The cutout of the common electrode may be a cross-shaped cutout, and the first connector and the second connector may overlap the cross-shaped cutout of the common electrode.

The first reference voltage applied to the one reference voltage line connected to the third switch circuit from among the first reference voltage line and the second reference voltage line, or a data voltage applied to the second reference voltage and the data line, may have a same polarity as the common voltage. Each of the first reference voltage and the second reference voltage may have a predetermined magnitude and polarities which change per frame. The common electrode may include a cutout, and the cutout of the common electrode may overlap the integral plate.

The cutout of the common electrode may be cross-shaped cutout, and the first connector and the second connector may overlap the cross-shaped cutout of the common electrode. The first reference voltage applied to the one reference voltage line connected to the third switch circuit from among the first reference voltage line and the second reference voltage line, or a data voltage applied to the second reference voltage and the data line, may have a same polarity as the common voltage. Each of the first reference voltage and the second reference voltage may have a predetermined magnitude and wherein the first and second reference voltages change per frame.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 1:
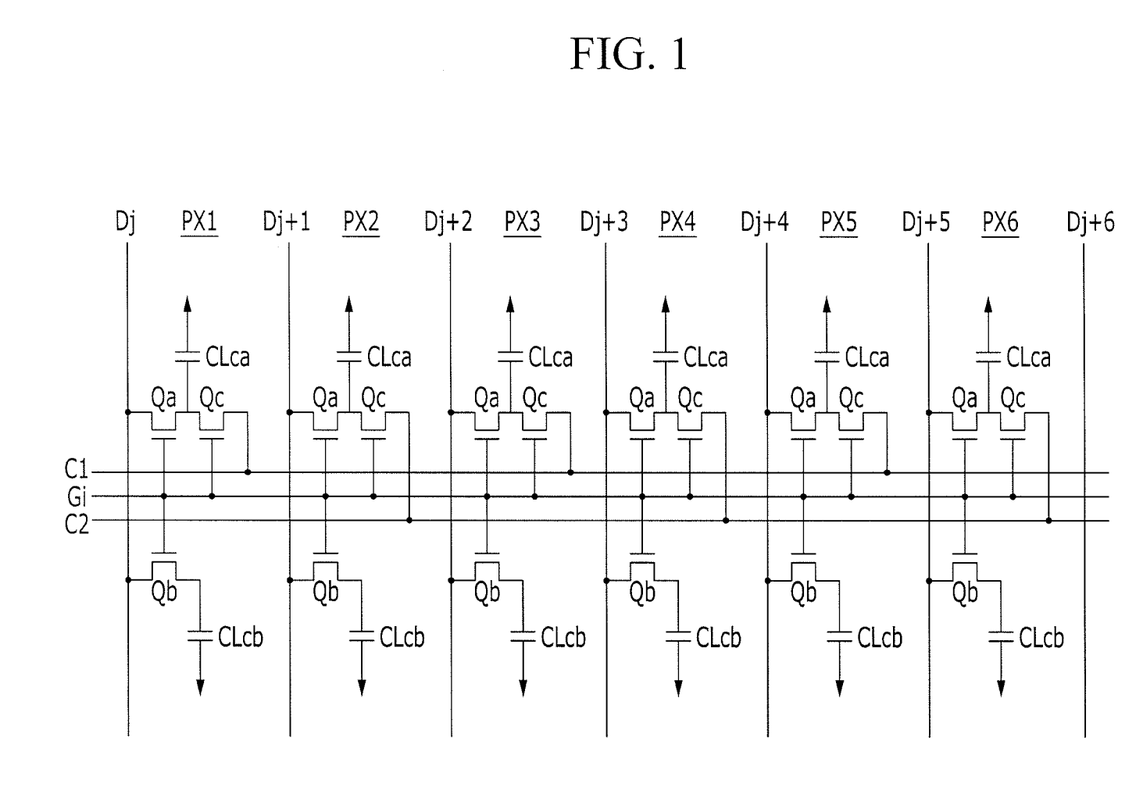
FIG. 1 illustrates an embodiment of adjacent pixels in a liquid crystal display.

FIG. 1 shows an embodiment of an equivalent circuit diagram of a plurality of adjacent pixels in a liquid crystal display. Referring to FIG. 1, the adjacent pixels include a first pixel PX1, a second pixel PX2, a third pixel PX3, a fourth pixel PX4, a fifth pixel PX5, and a sixth pixel PX6 arranged in a pixel row direction.

Signal lines Gi, Dj, Dj+1, Dj+2, Dj+3, Dj+4, Dj+5, C1, and C2 include a gate line (Gi) for transmitting a gate signal (also called a scanning signal), a plurality of data lines Dj, Dj+1, Dj+2, Dj+3, Dj+4, and Dj+5 for transmitting a data voltage, and a first reference voltage line C1 and a second reference voltage line C2 for respectively transmitting a predetermined reference voltage.

A first reference voltage and a second reference voltage have predetermined values and are applied to the first reference voltage line C1 and the second reference voltage line C2. Polarities of the first reference voltage line C1 and the second reference voltage line C2 are different from each other. Further, polarities of the first reference voltage and the second reference voltage may vary over a plurality of frames.

For example, when the common voltage is substantially 7.5 volts, the first reference voltage is substantially 15 volts or 0 volts per frame and the second reference voltage is substantially 0 volts or 15 volts. The first reference voltage and the second reference voltage are greater or less than a maximum value of the data voltage. A difference in values between the first and second reference voltages and the common voltage, when the first reference voltage and the second reference voltage have a positive polarity with respect to the common voltage, is different from a difference in values between the first and second reference voltages and the common voltage when the first reference voltage and the second reference voltage have a negative polarity with respect to the common voltage.

The first pixel PX1 includes a gate line (Gi), a first data line (Dj), a first reference voltage line (C1), and a first switching element Qa, also referred to as a first switch circuit, a second switching element Qb, also referred to as a second switch circuit, a third switching element (Qc), also referred to as a third switch circuit, a first liquid crystal capacitor (Clca), and a second liquid crystal capacitor (Clcb) connected thereto.

The first switching element Qa and the second switching element Qb are connected to the gate line (Gi) and the first data line (Dj), respectively. The third switching element (Qc) is connected to the gate line (Gi), the first reference voltage line C1, and an output terminal of the first switching element Qa.

The first switching element Qa and the second switching element Qb are three-terminal elements such as thin film transistors, and have a control terminal connected to the gate line (Gi) and an input terminal connected to the first data line (Dj). Further, the first switching element Qa includes an output terminal connected to the first liquid crystal capacitor (Clca) and an output terminal of the third switching element (Qc). The second switching element Qb includes an output terminal connected to the second liquid crystal capacitor (Clcb).

The third switching element (Qc) is a three-terminal element such as a thin film transistor, and includes a control terminal connected to the gate line (Gi), an input terminal connected to the first reference voltage line C1, and an output terminal connected to the second first liquid crystal capacitor (Clca).

The second pixel PX2 includes a gate line (Gi), a second data line Dj+1, and a second reference voltage line C2, and a first switching element Qa, a second switching element Qb, a third switching element (Qc), a first liquid crystal capacitor (Clca), and a second liquid crystal capacitor (Clcb) connected thereto.

The first switching element Qa and the second switching element Qb are connected to the gate line (Gi) and the second data line Dj+1, respectively. The third switching element (Qc) is connected to the gate line (Gi), the second reference voltage line C2, and the output terminal of the first switching element Qa.

The first switching element Qa and the second switching element Qb are three-terminal elements such as thin film transistors, and include a control terminal connected to the gate line (Gi) and an input terminal connected to the second data line Dj+1. The first switching element Qa includes an output terminal connected to the first liquid crystal capacitor (Clca) and an output terminal of the third switching element (Qc). The second switching element Qb includes an output terminal connected to the second liquid crystal capacitor (Clcb).

The third switching element (Qc) is a three-terminal element such as a thin film transistor, and includes a control terminal connected to the gate line (Gi), an input terminal connected to the second reference voltage line C2, and an output terminal connected to the first liquid crystal capacitor (Clca).

The third pixel PX3 includes a gate line (Gi), a third data line Dj+2, and a first reference voltage line C1, and a first switching element Qa, a second switching element (Qb), a third switching element (Qc), a first liquid crystal capacitor (Clca), and a second liquid crystal capacitor (Clcb) connected thereto.

The first switching element Qa and the second switching element Qb are connected to the gate line (Gi) and the third data line Dj+2, respectively. The third switching element (Qc) is connected to the gate line (Gi), the first reference voltage line C1, and the output terminal of the first switching element Qa.

The first switching element Qa and the second switching element Qb are three-terminal elements such as thin film transistors. The terminals include a control terminal connected to the gate line (Gi) and an input terminal connected to the third data line Dj+2. Further, the first switching element Qa includes an output terminal connected to the first liquid crystal capacitor (Clca) and an output terminal of the third switching element (Qc). The second switching element Qb includes an output terminal connected to the second liquid crystal capacitor (Clcb).

The third switching element (Qc) is a three-terminal element such as a thin film transistor. The terminals include a control terminal connected to the gate line (Gi), an input terminal connected to the first reference voltage line C1, and an output terminal connected to the first liquid crystal capacitor (Clca).

The fourth pixel PX4 includes a gate line (Gi), a fourth data line Dj+3, and a second reference voltage line C2, and a first switching element Qa, a second switching element Qb, a third switching element (Qc), a first liquid crystal capacitor (Clca), and a second liquid crystal capacitor (Clcb) connected thereto.

The first switching element Qa and the second switching element Qb are connected to the gate line (Gi) and the fourth data line Dj+3, respectively. The third switching element (Qc) is connected to the gate line (Gi), the second reference voltage line C2, and the output terminal of the first switching element Qa.

The first switching element Qa and the second switching element Qb are three-terminal elements such as thin film transistors. The terminals include a control terminal connected to the gate line (Gi) and an input terminal connected to the fourth data line Dj+3. Further, the first switching element Qa includes an output terminal connected to the first liquid crystal capacitor (Clca) and an output terminal of the third switching element (Qc). The second switching element Qb includes an output terminal connected to the second liquid crystal capacitor (Clcb).

The third switching element (Qc) is a three-terminal element such as a thin film transistor, and includes a control terminal connected to the gate line (Gi), an input terminal connected to the second reference voltage line C2, and an output terminal connected to the first liquid crystal capacitor (Clca).

The fifth pixel PX5 includes a gate line (Gi), a fifth data line Dj+4, and a first reference voltage line C1, and a first switching element Qa, a second switching element Qb, a third switching element (Qc), a first liquid crystal capacitor (Clca), and a second liquid crystal capacitor (Clcb) connected thereto.

The first switching element Qa and the second switching element Qb are connected to the gate line (Gi) and the fifth data line Dj+4, respectively. The third switching element (Qc) is connected to the gate line (Gi), the first reference voltage line C1, and the output terminal of the first switching element Qa.

The first switching element Qa and the second switching element Qb are three-terminal elements such as thin film transistors, and include a control terminal connected to the gate line (Gi) and an input terminal connected to the fifth data line Dj+4. The first switching element Qa includes an output terminal connected to the first liquid crystal capacitor (Clca) and the output terminal of the third switching element (Qc). The second switching element Qb includes an output terminal connected to the second liquid crystal capacitor (Clcb).

The third switching element (Qc) is a three-terminal element such as a thin film transistor. The terminals include a control terminal connected to the gate line (Gi), an input terminal connected to the first reference voltage line C1, and an output terminal connected to the first liquid crystal capacitor (Clca).

The sixth pixel PX6 includes a gate line (Gi), a sixth data line Dj+5, and a second reference voltage line C2, and a first switching element Qa, a second switching element Qb, a third switching element (Qc), a first liquid crystal capacitor (Clca), and a second liquid crystal capacitor (Clcb) connected thereto.

The first switching element Qa and the second switching element Qb are connected to the gate line (Gi) and the sixth data line Dj+5, respectively. The third switching element (Qc) is connected to the gate line (Gi), the second reference voltage line C2, and the output terminal of the first switching element Qa.

The first switching element Qa and the second switching element Qb are three-terminal elements such as thin film transistors. The terminals include a control terminal connected to the gate line (Gi) and an input terminal connected to the sixth data line Dj+5. Further, the first switching element Qa includes an output terminal connected to the first liquid crystal capacitor (Clca) and the output terminal of the third switching element (Qc). The second switching element Qb includes an output terminal connected to the second liquid crystal capacitor (Clcb).

The third switching element (Qc) is a three-terminal element such as a thin film transistor. The terminals include a control terminal connected to the gate line (Gi), an input terminal connected to the second reference voltage line C2, and an output terminal connected to the first liquid crystal capacitor (Clca).

The first reference voltage line C1 and the second reference voltage line C2 are alternately disposed for every group of three data lines.

When a gate-on signal is applied to the gate line (Gi), the first switching element Qa, the second switching element Qb, and the third switching element (Qc) of the six pixels PX1, PX2, PX3, PX4, PX5, and PX6 are turned on. Accordingly, a data voltage applied to the first data line (Dj) is applied to one terminal of each of the first liquid crystal capacitor (Clca) and the second liquid crystal capacitor (Clcb) of the first pixel PX1 through the first switching element Qa and the second switching element Qb of the turned-on first pixel PX1.

A data voltage applied to the second data line Dj+1 is applied to one terminal of each of the first liquid crystal capacitor (Clca) and the second liquid crystal capacitor (Clcb) of the second pixel PX2 through the first switching element Qa and the second switching element Qb of the turned-on second pixel PX2.

A data voltage applied to the third data line Dj+2 is applied to one terminal of each of the first liquid crystal capacitor (Clca) and the second liquid crystal capacitor (Clcb) of the third pixel PX3 through the first switching element Qa and the second switching element Qb of the turned-on third pixel PX3.

A data voltage applied to the fourth data line Dj+3 is applied to one terminal of each of the first liquid crystal capacitor (Clca) and the second liquid crystal capacitor (Clcb) of the fourth pixel PX4 through the first switching element Qa and the second switching element Qb of the turned-on fourth pixel PX4.

A data voltage applied to the fifth data line Dj+4 is applied to one terminal of each of the first liquid crystal capacitor (Clca) and the second liquid crystal capacitor (Clcb) of the fifth pixel PX5 through the first switching element Qa and the second switching element Qb of the turned-on fifth pixel PX5.

A data voltage applied to the sixth data line Dj+5 is applied to one terminal of each of the first liquid crystal capacitor (Clca) and the second liquid crystal capacitor (Clcb) of the sixth pixel PX6 through the first switching element Qa and the second switching element Qb of the turned-on sixth pixel PX6.

The first liquid crystal capacitor (Clca) and the second liquid crystal capacitor (Clcb) of the first pixel PX1 are charged with a same voltage. The first liquid crystal capacitor (Clca) and the second liquid crystal capacitor (Clcb) of the second pixel PX2 are charged with a same voltage. The first liquid crystal capacitor (Clca) and the second liquid crystal capacitor (Clcb) of the third pixel PX3 are charged with a same voltage.

The first liquid crystal capacitor (Clca) and the second liquid crystal capacitor (Clcb) of the fourth pixel PX4 are charged with a same voltage. The first liquid crystal capacitor (Clca) and the second liquid crystal capacitor (Clcb) of the fifth pixel PX5 are charged with a same voltage. The first liquid crystal capacitor (Clca) and the second liquid crystal capacitor (Clcb) of the sixth pixel PX6 are charged with a same voltage.

Simultaneously, one terminal of each of the first pixel PX1, the third pixel PX3, and the fifth pixel PX5 of the first liquid crystal capacitor (Clca) are connected to the output terminal of the third switching element (Qc), and are boosted by a reference voltage applied to the first reference voltage line C1 through the third switching element (Qc). In this instance, the first reference voltage applied to the first reference voltage line C1 has a same polarity as the data voltage applied to the first data line (Dj), the third data line Dj+2, and the fifth data line Dj+4, and is greater than the data voltage applied to the first data line (Dj), the third data line Dj+2, and the fifth data line Dj+4. Therefore, the voltage at the first reference voltage line C1, to which a relatively high voltage is applied, is divided through the third switching element (Qc). As a result, the voltage charged in the first liquid crystal capacitor (Clca) becomes greater than the data voltage applied through the first data line (Dj), the third data line Dj+2, and the fifth data line Dj+4.

One terminal of each of the first liquid crystal capacitors (Clca) of the second pixel PX2, the fourth pixel PX4, and the sixth pixel PX6 is connected to the output terminal of the third switching element (Qc), and is boosted by the reference voltage applied to the second reference voltage line C2 through the third switching element (Qc). In this instance, the second reference voltage applied to the second reference voltage line C2 has the same polarity as the data voltage applied to the second data line Dj+1, the fourth data line Dj+3, and the sixth data line Dj+5, and is greater than the data voltage applied to the second data line Dj+1, the fourth data line Dj+3, and the sixth data line Dj+5. Therefore, the voltage at the second reference voltage line C2, to which a relatively high voltage is applied, is divided through the third switching element (Qc). Also, the voltage charged in the first liquid crystal capacitor (Clca) has a greater value than the data voltage applied through the second data line Dj+1, the fourth data line Dj+3, and the sixth data line Dj+5.

The voltage charged in the first liquid crystal capacitor (Clca) becomes different from the voltage charged in the second liquid crystal capacitor (Clcb). Hence, inclined angles of liquid crystal molecules in the first subpixel and the second subpixel are different and the luminances of the subpixels are different. When the voltage charged in the first liquid crystal capacitor (Clca) and the voltage charged in the second liquid crystal capacitor (Clcb) are appropriately controlled, an image viewed from a lateral side is controlled to be close in visibility to the image viewed from the front side. e.g., lateral visibility is improved.

Figure 2:
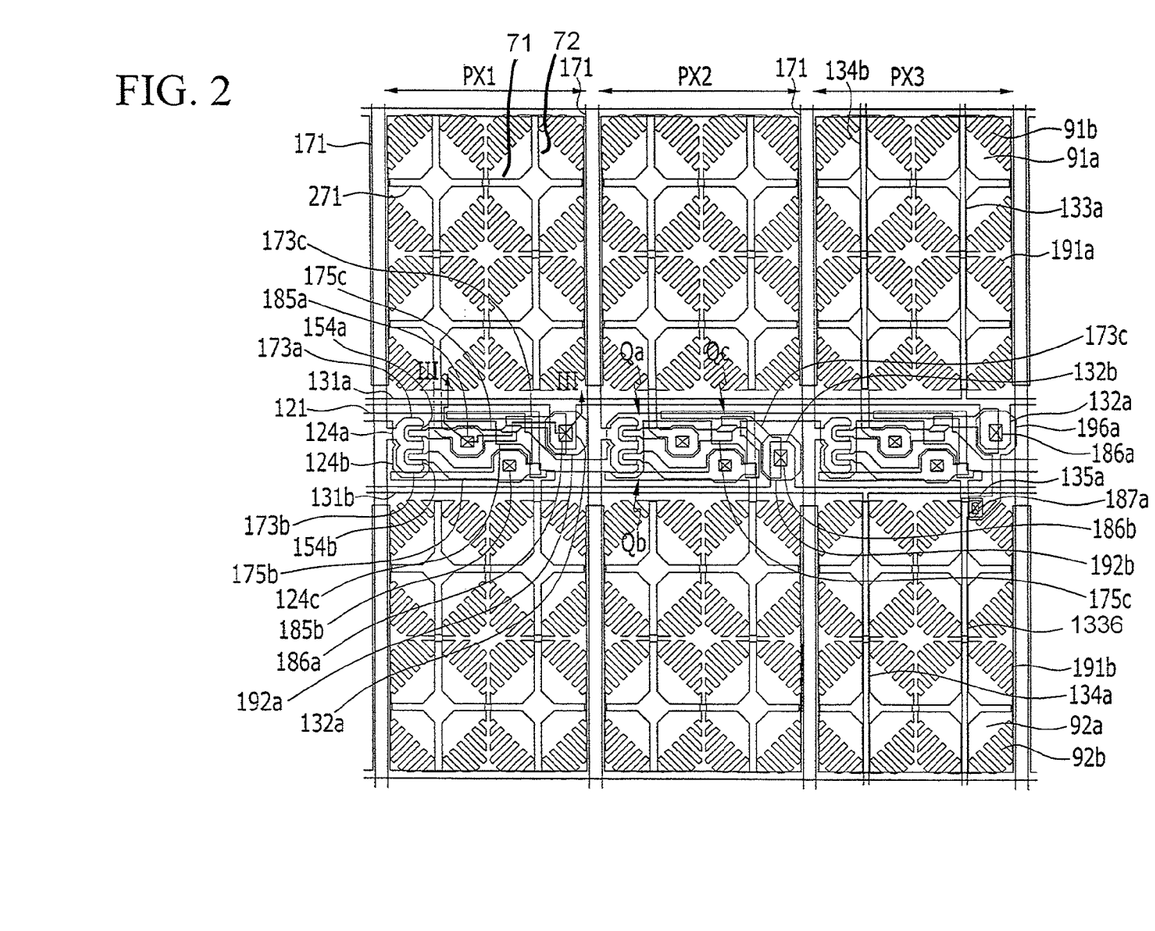
FIG. 2 illustrates a layout embodiment of pixels in a liquid crystal display.
Figure 3:
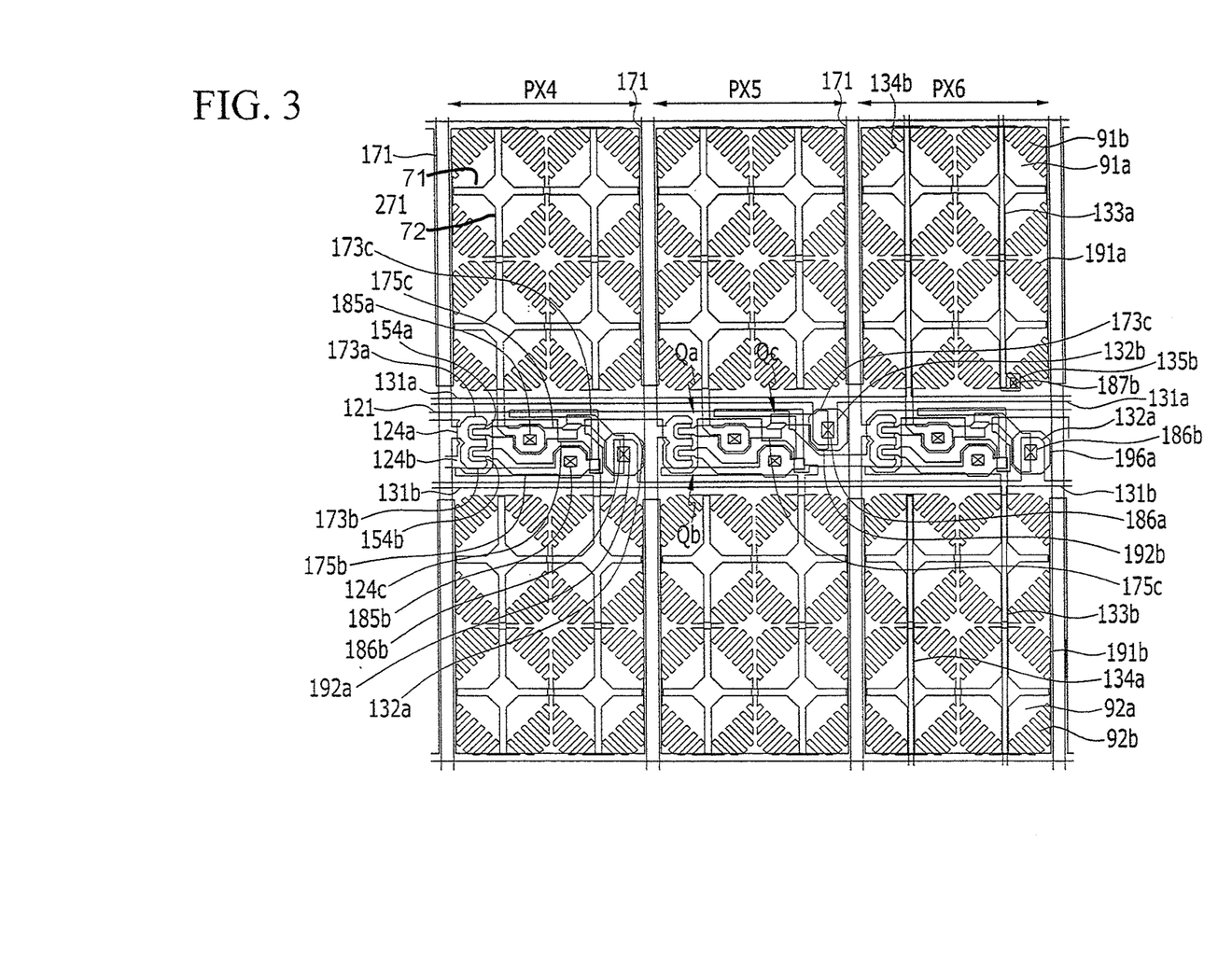
FIG. 3 illustrates another layout embodiment of pixels in a liquid crystal display.
Figure 4:
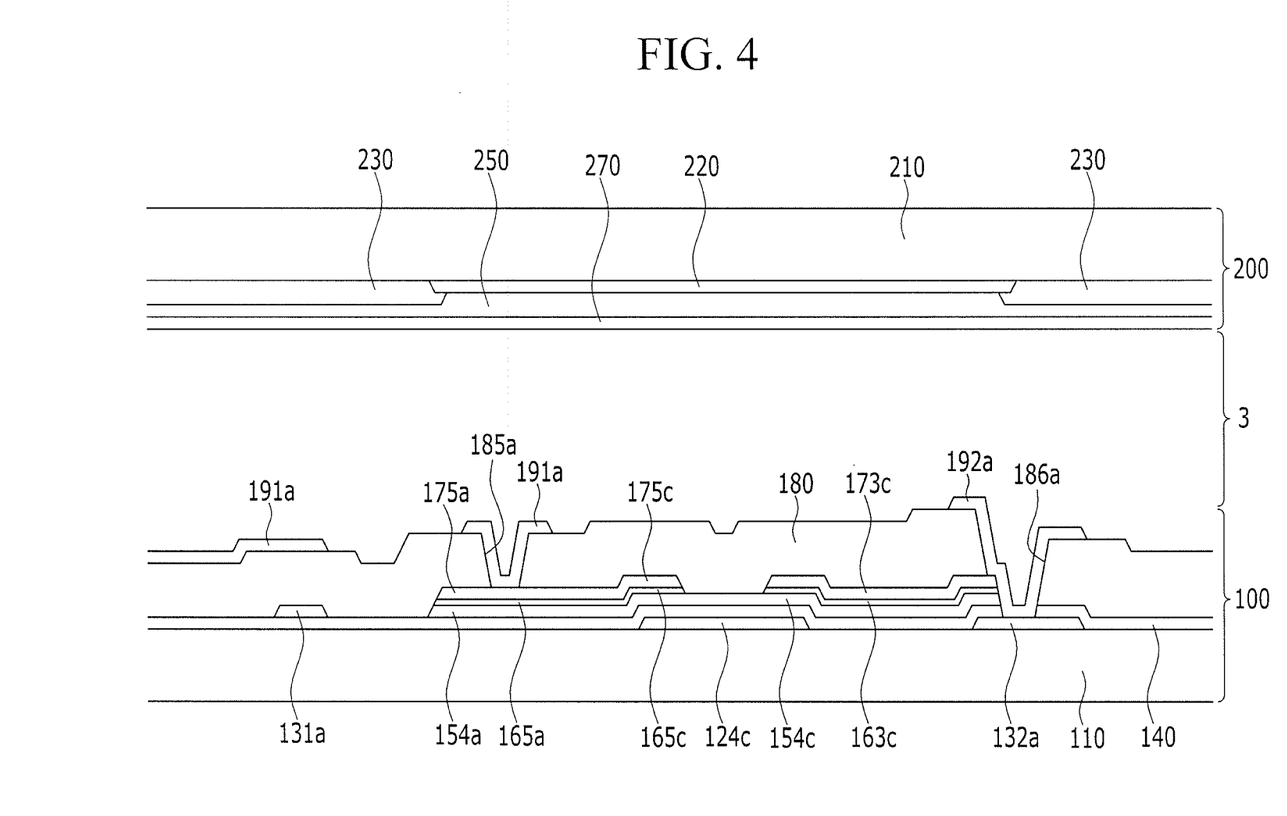
FIG. 4 illustrates a view of the display along section line IV-IV in FIG. 2.
Figure 5:
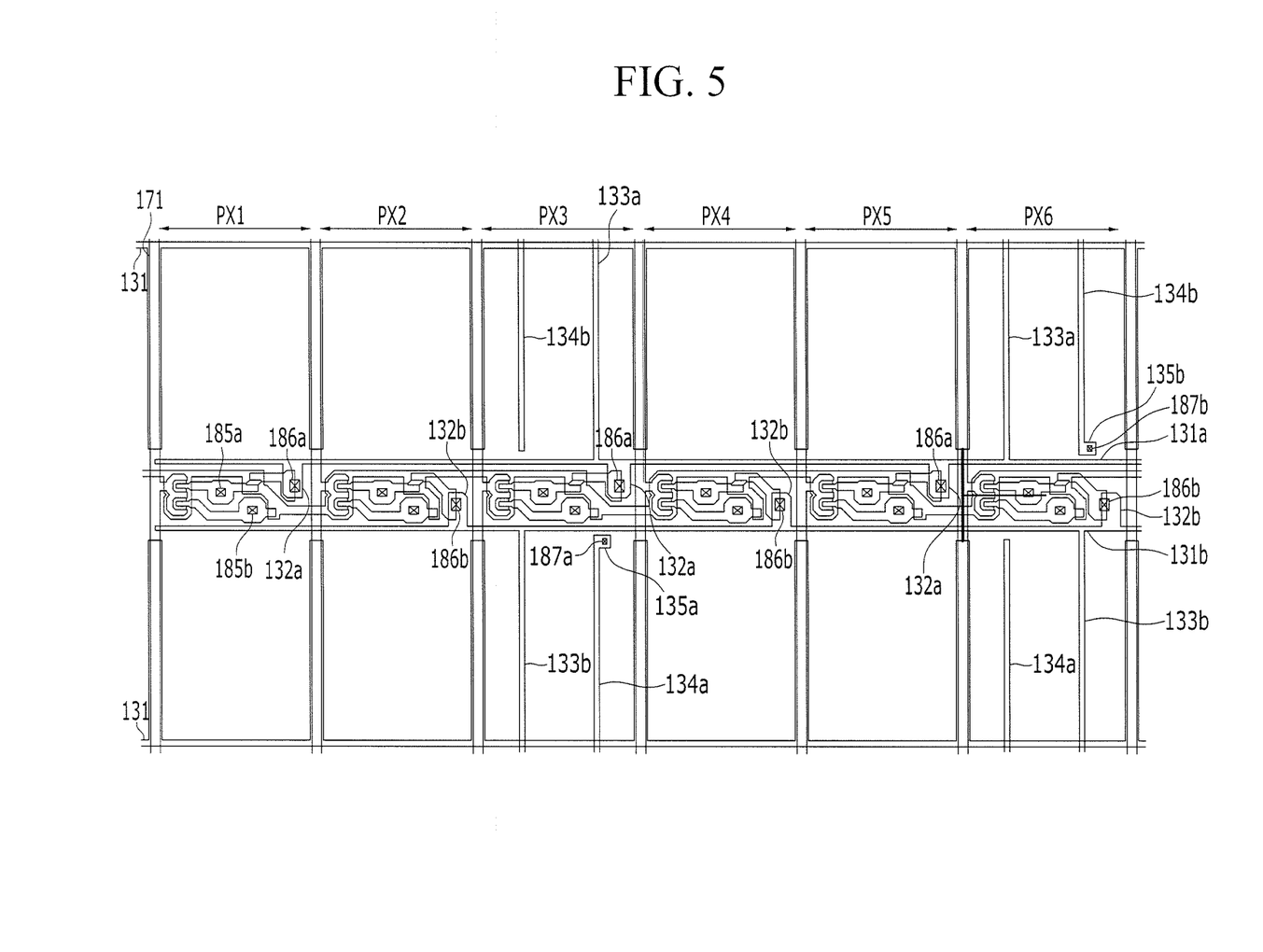
FIG. 5 illustrates a layout embodiment of wires in a liquid crystal display.

FIG. 2 illustrates a layout view of an embodiment of pixels of a liquid crystal display. FIG. 3 illustrates a layout view of pixels of an embodiment of a liquid crystal display. FIG. 4 illustrates a cross-sectional view of the liquid crystal display along line IV-IV in FIG. 2. FIG. 5 illustrates a layout view of wires of a liquid crystal display according to one embodiment.

Referring to FIGS. 2 to 5, the liquid crystal display includes a liquid crystal layer 3 between display panels 100 and 200.

In the first display panel 100, a gate conductor is formed on a first substrate 110. The gate conductor includes a gate line 121, a storage electrode line, a first reference voltage line 131a, and a second reference voltage line 131b. The gate line 121 transmits a gate signal and includes a first gate electrode 124a, a second gate electrode 124b, and a third gate electrode 124c. The first reference voltage line 131a includes a first expander 132a and the second reference voltage line 131b includes a second expander 132b. The first reference voltage line 131a includes a first connector 133a parallel to a data line 171, and the second reference voltage line 131b includes a second connector 133b parallel to the data line 171.

In the pixel column direction, a third connector 134a extends in series with the first connector 133a of the first reference voltage line 131a and includes a third expander 135a. Similarly, in the pixel column direction, a fourth connector 134b extends in series with the second connector 133b of the second reference voltage line 131b and includes a fourth expander 135b.

The first connector 133a of the first reference voltage line 131a is connected to the third expander 135a of the third connector 134a through a first connection bridge 196a. The second connector 133b of the second reference voltage line 131b is connected to the fourth expander 135b of the fourth connector 134b through a second connection bridge 196b.

The first connector 133a and the third connector 134a are provided on two pixels that are adjacent in the pixel column direction and are connected to each other. The second connector 133b and the fourth connector 134b are provided on two pixels that are adjacent in the pixel column direction and are connected to each other.

The first connector 133a and the third connector 134a are connected to the first reference voltage line 131a and receive the first reference voltage. The second connector 133b and the fourth connector 134b are connected to the second reference voltage line 131b and receive the second reference voltage. The first and second connectors 133a and 133b are provided for every group of three pixels.

A gate insulating layer 140 is on the gate conductors 121, 131, 131a, and 131b, and a first semiconductor 154a, a second semiconductor 154b, and a third semiconductor 154c are on the gate insulating layer 140. Ohmic contacts 165a, 163c, and 165c are on the first semiconductor 154a, the second semiconductor 154b, and the third semiconductor 154c. The semiconductors 154a, 154b, and 154c may include, for example, oxide semiconductors. If the semiconductors 154a, 154b, and 154c include oxide semiconductors, the ohmic contacts may be omitted.

A data conductor includes a data line 171. The data line 171 includes a first source electrode 173a and a second source electrode 173b, a third source electrode 173c, a first drain electrode 175a, a second drain electrode 175b, a third drain electrode 175c, a first reference voltage line 172a, and a second reference voltage line 172b. The data line 171 is formed on the ohmic contacts 165a, 163c, and 165c and the gate insulating layer 140. The first drain electrode 175a is connected to the third drain electrode 175c.

The first reference voltage line 172a and the second reference voltage line 172b are parallel to the data line 171, are formed for every group of three pixels, and are alternately disposed.

A passivation layer 180 is on the data conductors 171, 172a, 172b, 173a, 173b, 173c, 175a, 175b, and 175c. The passivation layer 180 includes an inorganic insulator or an organic insulator.

A first contact hole 185a exposes part of the first drain electrode 175a. A second contact hole 185b exposes part of the second drain electrode 175b. The first and second contact holes 185a and 185b are formed on the passivation layer 180.

A third contact hole 186a exposes the first reference voltage line 172a, the first expander 132a of the first reference voltage line 131a, and the third source electrode 173a. A fourth contact hole 186b exposes the second reference voltage line 172b, the second expander 132b of the second reference voltage line 131b, and the third source electrode 173a. The third and fourth contact holes 186a and 186b are formed on the gate insulating layer 140 and the passivation layer 180.

A fifth contact hole 187a exposes the third expander 135a of the third connector 134a. A sixth contact hole 187b exposes a fourth expander 135b of the fourth connector 134b. The fifth and sixth contact holes 187a and 187b are formed on the gate insulating layer 140 and the passivation layer 180.

A first subpixel electrode 191a, a second subpixel electrode 191b, the first connection bridge 196a, and the second connection bridge 196b are formed on the passivation layer 180. The first subpixel electrode 191a is physically and electrically connected to the first drain electrode 175a through the first contact hole 185a. The second subpixel electrode 191b is physically and electrically connected to the second drain electrode 175b through the second contact hole 185b.

The first subpixel electrode 191a is separated from the second subpixel electrode 191b with the gate line 121 therebetween, and are provided on an upper part and a lower part of the pixel area with respect to the gate line 121 and neighbor each other in the column direction.

The first subpixel electrode 191a and the second subpixel electrode 191b respectively include integral plates 91a and 92a, referred to hereinafter as "plates 91a and 92a," having a rhombus shape and a plurality of branch electrodes 91b and 92b that respectively extend in four different directions from the plates 91a and 92a. Each of the branch electrodes 91b and 92b includes a portion that obliquely extends in a top right direction, a portion that obliquely extends in a bottom right direction, a portion that obliquely extends in a top left direction, and a portion that obliquely extends in a bottom left direction.

As described, the directions in which the liquid crystal molecules of the liquid crystal layer 3 are inclined are different at the portions where the directions in which the branch electrodes 91b and 92b extend are different. Hence, four domains with different directions in which the liquid crystal molecules are inclined are formed on the liquid crystal layer 3. When the directions in which the liquid crystal molecules are inclined are varied, a reference viewing angle of the liquid crystal display is increased.

The first subpixel electrode 191a and the second subpixel electrode 191b are respectively divided into a plurality of subregions by the rhombus-shaped plates 91a and 92a and the plurality of branch electrodes 91b and 92b extended in four different directions from the plates 91a and 92a. An area of the second subpixel electrode 191b is greater than an area of the first subpixel electrode 191a. In another embodiment, the first subpixel electrode 191a and the second subpixel electrode 191b of the liquid crystal display may have a different shape as discussed above.

The connectors 133a, 133b, 134a, and 134b of the first reference voltage line 131a and the second reference voltage line 131b overlap the plates 91a and 92a of the first subpixel electrode 191a and the second subpixel electrode 191b. The area where the first subpixel electrode 191a overlaps the connectors 133a, 133b, 134a, and 134b corresponds to the area where the second subpixel electrode 191b overlaps the connectors 133a, 133b, 134a, and 134b.

The first connection bridge 196a is formed over the third contact hole 186a and the fifth contact hole 187a, to connect the first expander 132a of the first reference voltage line 131a and the third source electrode 173c and to connect the first reference voltage line 131a and the third connector 134a.

The second connection bridge 196b is formed over the fourth contact hole 186b and the sixth contact hole 187b, to connect the second expander 132b of the second reference voltage line 131b and the third source electrode 173c and to connect the second reference voltage line 131b and the fourth connector 134b.

The first gate electrode 124a, the first semiconductor 154a, the first source electrode 173a, and the first drain electrode 175a form a first switching element Qa. The second gate electrode 124b, the second semiconductor 154b, the second source electrode 173b, and the second drain electrode 175b form a second switching element Qb. The third gate electrode 124c, the third semiconductor 154c, the third source electrode 173c, and the third drain electrode 175c form a third switching element (Qc).

In the second display panel 200, a light blocking member 220 is provided on a second substrate 210. The light blocking member 220 is also called a black matrix and may prevent light leakage. A plurality of color filters 230 are provided on the second substrate 210 and the light blocking member 220. An overcoat 250 is provided on the color filter 230. The overcoat 250 prevents the color filter 230 and the light blocking member 220 from being lifted. The overcoat 250 also controls contamination of the liquid crystal layer 3 caused by an organic material such as a solvent input by the color filter 230 to prevent faults, such as an afterimage that may be induced when a screen is driven. A common electrode 270 is provided on the overcoat 250. In another embodiment, the overcoat 250 may be omitted.

The light blocking member 220 and the color filter 230 are provided on the second display panel 200 in the liquid crystal display according to the present exemplary embodiment. A light blocking member 220 and a color filter 230 may be provided on the first display panel 100 in a liquid crystal display according to another exemplary embodiment. In this case, the color filter 230 may be provided instead of the passivation layer 180 of the first display panel 100.

The common electrode 270 is formed on positions that correspond to respective subregions of the first subpixel electrode 191a and the second subpixel electrode 191b. The common electrode 270 includes a cross-shaped cutout 271 comprising a horizontal cutout 71 parallel to the gate line and a perpendicular stem 72 parallel to the data line. The cross-shaped cutout 271 of the common electrode 270 overlaps the plates 91a and 92a of the first subpixel electrode 191a and the second subpixel electrode 191b. From a top view of the liquid crystal display, the respective subregions of the first subpixel electrode 191a and the second subpixel electrode 191b are divided into four regions by the cross-shaped cutout 271 of the common electrode 270 and a plurality of branch electrodes 91b and 92b of the pixel electrodes 191a and 191b.

The first connector 133a and the third connector 134a connected to the first reference voltage line 131a and the second connector 133b and the fourth connector 134b connected to the second reference voltage line 131b overlap the plates 91a and 92a of the first subpixel electrode 191a and the second subpixel electrode 191b and overlap the perpendicular stem 72 of the cross-shaped cutout 271 of the common electrode 270.

The first subpixel electrode 191a and the common electrode 270 form the first liquid crystal capacitor (Clca) with the liquid crystal layer 3 therebetween. The second subpixel electrode 191b and the common electrode 270 form the second liquid crystal capacitor (Clcb) with the liquid crystal layer 3 therebetween.

An electric field is applied to the liquid crystal layer 3 by voltages applied to the first subpixel electrode 191a and the second subpixel electrode 191b and the common voltage applied to the common electrode 270. The orientation of the liquid crystal molecules of the liquid crystal layer 3 is determined by the electric field intensity. Luminance of light passing through the liquid crystal layer 3 may vary based on the orientation of the liquid crystal molecules.

Referring to FIG. 5, the first connector 133a and the third connector 134a for receiving the first reference voltage and the second connector 133b and the fourth connector 134b for receiving the second reference voltage are provided for every group of three pixels. For example, the first connector 133a and the third connector 134a for receiving the first reference voltage and the second connector 133b and the fourth connector 134b for receiving the second reference voltage are provided on the third pixel PX3 and the sixth pixel PX6 from among the six pixels PX1, PX2, PX3, PX4, PX5, and PX6.

The first connector 133a and the third connector 134a for receiving the first reference voltage and the second connector 133b and the fourth connector 134b for receiving the second reference voltage are parallel to the data line 171. The first and third connectors 133a and 134a overlap the plates 91a and 92a of the first subpixel electrode 191a and the second subpixel electrode 191b, and overlap the perpendicular stem 72 of the cross-shaped cutout 271 of the common electrode 270.

An area in which the first subpixel electrode 191a overlaps the connectors 133a, 133b, 134a, and 134b corresponds to an area in which the second subpixel electrode 191b overlaps the connectors 133a, 133b, 134a, and 134b.

In the present embodiment, the first connector 133a and the third connector 134a, which are parallel to the data line 171 and transmit the first reference voltage, and the second connector 133b and the fourth connector 134b, which are parallel to the data line 171 and transmit the second reference voltage, overlap the perpendicular stem 72 of the cross-shaped cutout 271 of the common electrode 270. Therefore, deterioration of the aperture ratio, induced by the first connector 133a and the third connector 134a connected to the first reference voltage line 131a to apply the first reference voltage, and the second connector 133b and the fourth connector 134b, connected to the second reference voltage line 131b to apply the second reference voltage, may be reduced or prevented.

The first connector 133a and the third connector 134a and the second connector 133b and the fourth connector 134b overlap the plates 91a and 92a of the first subpixel electrode 191a and the second subpixel electrode 191b. As a result, when the connectors 133a, 133b, 134a, and 134b are misaligned to the right or left from the pixel electrodes 191a and 191b during a manufacturing process, the area in which the connectors 133a, 133b, 134a, and 134b overlap the pixel electrodes 191a and 191b is not substantially changed. An area in which the first subpixel electrode 191a overlaps the connectors 133a, 133b, 134a, and 134b corresponds to an area in which the second subpixel electrode 191b overlaps the connectors 133a, 133b, 134a, and 134b.

When they do not overlap the plates 91a and 92a of the pixel electrodes 191a and 191 b, but edges of the branch electrodes 91b and 92b or the pixel electrodes 191a and 191b, and a misalignment occurs to the right or the left, the area in which the connectors 133a, 133b, 134a, and 134b overlap the pixel electrodes 191a and 191b may be substantially changed.

However, the first connector 133a and the third connector 134a and the second connector 133b and the fourth connector 134b, which are parallel to the data line 171 for transmitting the first reference voltage and the second reference voltage, overlap the plates 91a and 92a of the first subpixel electrode 191a and the second subpixel electrode 191b to reduce a change in the overlap area between the connectors 133a, 133b, 134a, and 134b and the pixel electrodes 191a and 191b. As a result, a change of capacitance and a change in pixel voltage may be reduced or prevented. Thus, when the polarities of the first reference voltage and the second reference voltage are changed for respective frames, the pixel voltage is not changed.

Figure 6:
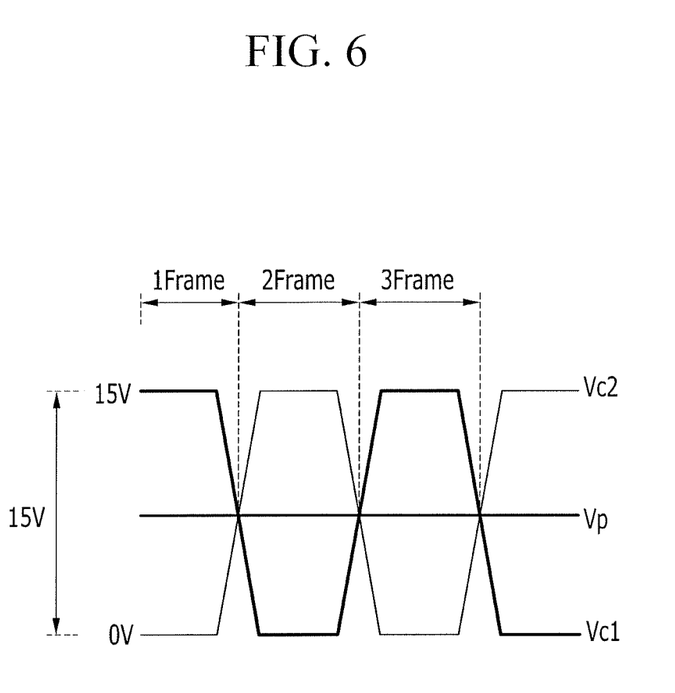
FIG. 6 illustrates an example of voltage changes in a pixel area per frame.

FIG. 6 illustrates an example of a first reference voltage and a second reference voltage, and more particularly illustrates a waveform diagram of changes in voltage of a pixel area according to a voltage supplied per frame.

Referring to FIG. 6, the first reference voltage Vc1 applied to the first reference voltage line 131a has a value of substantially 15 volts for a first frame, 0 volts for a second frame, and 15 volts for a third frame. The second reference voltage Vc2 applied to the second reference voltage line 131b has a value of substantially 0 volts for a first frame, 15 volts for a second frame, and 0 volts for a third frame.

When the polarities of the first reference voltage Vc1 and the second reference voltage Vc2, which have different polarities, change for respective frames, the areas where the subpixel electrodes 191a and 191b overlap the first reference voltage line 131a and the second reference voltage line 131b are the same, which does not influence the voltage Vp charged in the subpixel electrodes 191a and 191b. Thus, the voltage Vp is maintained.

Figure 7:
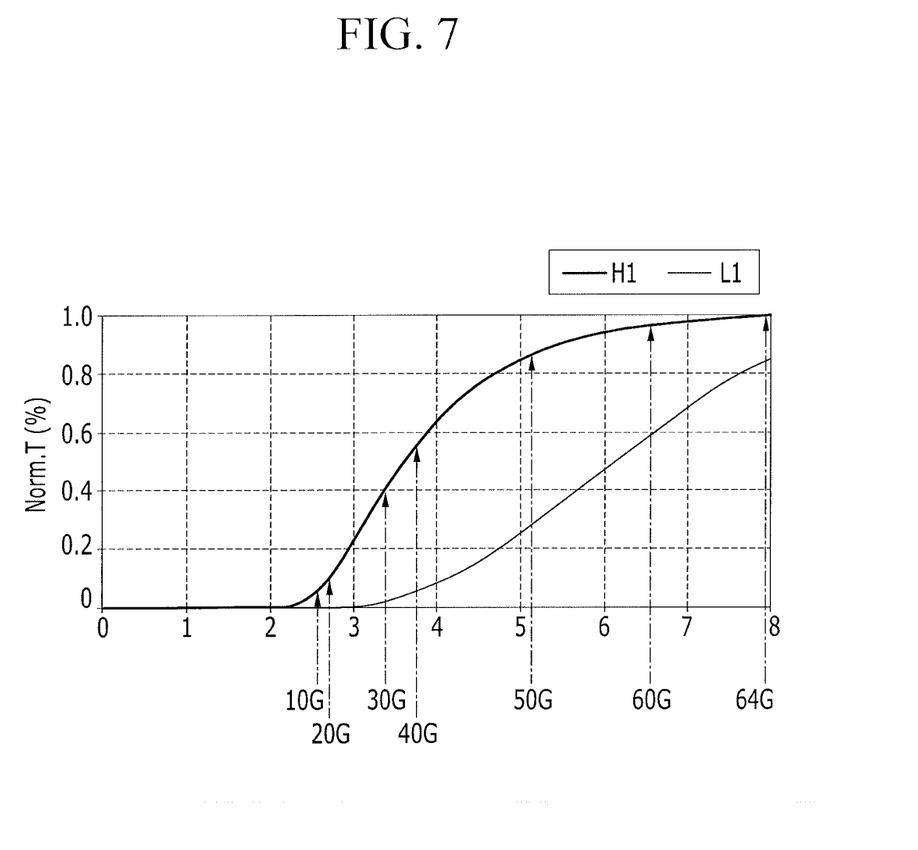
FIGS. 7 and 8 illustrate examples of changes in transmittance based on pixel voltage.
Figure 8:
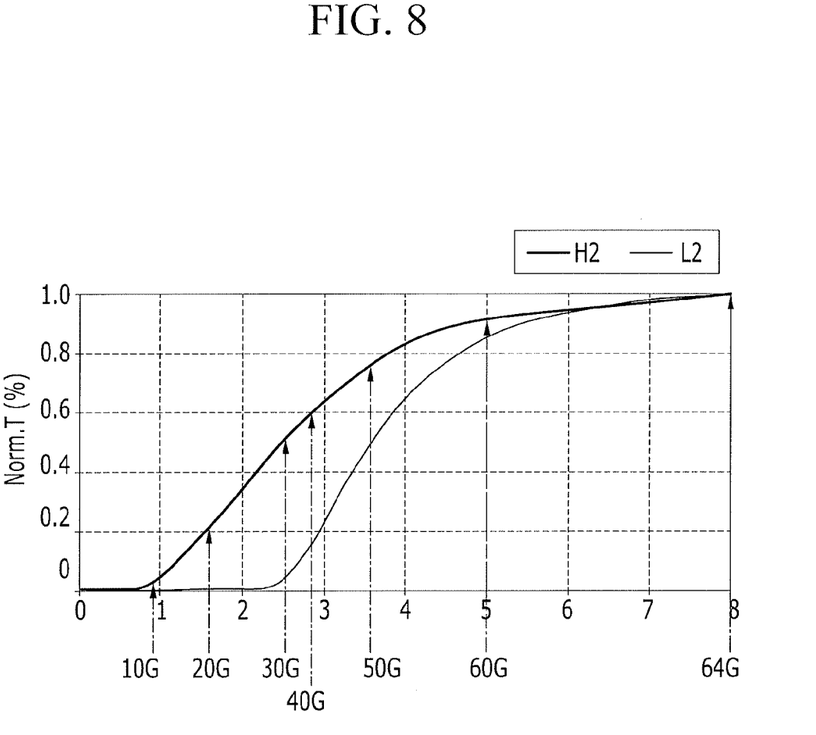

FIGS. 7 and 8 illustrate examples of changes in transmittance according to a pixel voltage of a liquid crystal display. More particularly, FIG. 7 shows changes (H1) in transmittance according to the data voltage applied to the first subpixel electrode and changes (L1) in transmittance according to the data voltage applied to the second subpixel electrode. These changes are shown under the condition where the pixel electrode is classified as a first subpixel electrode and a second subpixel electrode, and the voltage applied to the second subpixel electrode is divided to control the voltage at the second subpixel electrode to be less than an input data voltage.

FIG. 8 shows changes (H2) in transmittance according to the data voltage applied to the first subpixel electrode and changes (L2) in transmittance according to the data voltage applied to the second subpixel electrode. These changes are shown under the condition where the pixel electrode is classified as a first subpixel electrode and a second subpixel electrode, and the voltage at the first subpixel electrode is controlled to be greater than the input data voltage.

Referring to FIG. 7, the voltage at the second subpixel electrode is reduced by a predetermined value, from among the first subpixel electrode and the second subpixel electrode to which the same data voltage is applied through the data line. When the input data voltage value is relatively low, for example, when the data voltage is less than substantially 4 volts, the entire transmittance depends on transmittance of the first subpixel electrode H1. The transmittance rarely changes in a low gray scale region, for example, to substantially a gray level of 20 (20G). Thus, it may not be possible to express the gray scale values in this region.

An increased rate of transmittance induced by the applied data voltage is increased in the region from substantially a gray level of 20 (20G) to a gray level of 40 (40G). The rate of transmittance is abruptly increased so that the screen may look white. As described, it may be difficult to express gray scale values following the data voltage in the low gray scale region. In the case of a high gray region, for example, when the data voltage is substantially 6.7 volts, the transmittance rate caused by the voltage at the second subpixel electrode is reduced, so the entire transmittance of the liquid crystal display is less than the input data voltage. Therefore, transmittance efficiency of the liquid crystal display becomes less compared to the driving voltage.

Referring to FIG. 8, the voltage at the first subpixel electrode is increased by a predetermined value, from among the first subpixel electrode and the second subpixel electrode to which the same data voltage is applied through the data line. The change in transmittance caused by the applied data voltage is manifest in the low gray scale region. It may therefore not be possible to express low gray levels.

The increased rate in transmittance caused by the applied data voltage is substantially constant in the low gray scale region, thereby reducing or preventing the screen from being expressed as white when the transmittance abruptly increases at a specific gray scale value. Further, in the case of the high gray scale region, for example, when the data voltage is substantially 6.7 volts, transmittance is not reduced and the entire transmittance of the liquid crystal display is increased, thereby increasing driving efficiency of the liquid crystal display.

In accordance with one or more of the aforementioned embodiments, lateral visibility is controlled to approach front visibility, accurate gray expression is allowable in a low gray scale region, deterioration in luminance is reduced or prevented compared to the driving voltage, changes in pixel voltage are reduced or prevented by the first reference voltage line and the second reference voltage line for transmitting the first voltage and the second voltage having different polarities, and/or deterioration of the aperture ratio by the first reference voltage line and the second reference voltage line is reduced or prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A liquid crystal display, comprising:
   a first substrate;
   a gate line on the first substrate;
   a plurality of data lines on the first substrate;
   a first reference voltage line and a second reference voltage line disposed on the first substrate and applying a first reference voltage and a second reference voltage having different polarities, respectively;
   a pixel electrode in one pixel area including a first subpixel electrode and a second subpixel electrode;
   a first switch circuit connected to the gate line, a first data line from among the plurality of data lines, and the first subpixel electrode;
   a second switch circuit connected to the gate line, the first data line, and the second subpixel electrode;

a third switch circuit connected to the gate line, the first subpixel electrode, and one of the first reference voltage line and the second reference voltage line;

a second substrate facing the first substrate; and a common electrode on the second substrate and including a cross-shaped cutout including a horizontal stem parallel to the gate line and a perpendicular stem parallel to the data line, wherein the first reference voltage line and the second reference voltage line include a first connector and a second connector parallel to the data line, and wherein the first connector and the second connector parallel to the data line overlap the perpendicular stem of the cross-shaped cutout of the common electrode.

2. The display as claimed in claim 1, wherein:

a voltage difference between a first voltage of the first subpixel electrode and a common voltage of the common electrode is greater than a voltage difference between a second voltage of the second subpixel electrode and the common voltage.

3. The display as claimed in claim 2, wherein:

the first subpixel electrode and the second subpixel electrode include an integral plate and a plurality of branch electrodes extending from the integral plate, and the cross-shaped cutout of the common electrode overlaps the integral plate.

4. The display as claimed in claim 3, wherein the first connector and the second connector overlap the integral plate.

5. The display as claimed in claim 4, wherein:

the first reference voltage or the second reference voltage applied to one of the first reference voltage line or the second reference voltage line, the one of the first reference voltage line or the second reference voltage line being connected to the third switch circuit, has the same polarity as a data voltage applied to a data line with respect to the common voltage.

6. The display as claimed in claim 5, wherein each of the first and second reference voltages has a predetermined magnitude and wherein the first and second reference voltages have polarities which change per frame.

7. The display as claimed in claim 2, wherein:

the first reference voltage or the second reference voltage applied to one of the first reference voltage line or the second reference voltage line, the one of the first reference voltage line or the second reference voltage line being connected to the third switch circuit, has the same polarity as a data voltage applied to a data line with respect to the common voltage.

8. The display as claimed in claim 7, wherein each of the first and second reference voltages has a predetermined magnitude and wherein the first and second reference voltages have polarities which change per frame.

9. A liquid crystal display, comprising:

a first substrate;

a gate line on the first substrate;

a plurality of data lines on the first substrate;

a first reference voltage line and a second reference voltage line disposed on the first substrate and applying a first reference voltage and a second reference voltage having different polarities;

a pixel electrode in one pixel area and including a first subpixel electrode and a second subpixel electrode;

a first switch circuit connected to the gate line, a first data line from among the plurality of data lines, and the first subpixel electrode;

a second switch circuit connected to the gate line, the first data line, and the second subpixel electrode;

a third switch circuit connected to the gate line, the first subpixel electrode, and one of the first reference voltage line and the second reference voltage line;

a second substrate facing the first substrate; and a common electrode disposed between the first substrate and the second substrate and including a cross-shaped cutout including a horizontal stem parallel to the gate line and a perpendicular stem parallel to the data line, wherein the first reference voltage line and the second reference voltage line include a first connector and a second connector parallel to the data line, wherein the first subpixel electrode and the second subpixel electrode include an integral plate and a plurality of branch electrodes extending from the integral plate, and wherein the first connector and the second connector overlap the integral plate of the pixel electrode and the perpendicular stem of the cross-shaped cutout of the common electrode.

10. The display as claimed in claim 9, wherein:

a voltage difference between a first pixel voltage of the first subpixel electrode and a common voltage of the common electrode is greater than a voltage difference between a second voltage of the second subpixel electrode and the common voltage.

11. The display as claimed in claim 10, wherein:

the first reference voltage or the second reference voltage applied to one of the first reference voltage line or the second reference voltage line, the one of the first reference voltage line or the second reference voltage line being connected to the third switch circuit, has the same polarity as a data voltage applied to a data line with respect to the common voltage.

12. The display as claimed in claim 11, wherein each of the first reference voltage and the second reference voltage has a predetermined magnitude and polarities which change per frame.

13. The display as claimed in claim 9, wherein:

the first reference voltage or the second reference voltage applied to one of the first reference voltage line or the second reference voltage line, the one of the first reference voltage line or the second reference voltage line being connected to the third switch circuit, has the same polarity as a data voltage applied to a data line with respect to the common voltage of the common electrode.

14. The display as claimed in claim 13, wherein each of the first reference voltage and the second reference voltage has a predetermined magnitude and wherein the first and second reference voltages change per frame.

* * * * *